(12) United States Patent
Winter et al.

(10) Patent No.: US 7,580,800 B1
(45) Date of Patent: Aug. 25, 2009

(54) TOOLS FOR EVALUATING AND REPORTING CANOPY INTEGRITY

(75) Inventors: Neil S. Winter, Aiken, SC (US); D. Eric Wilson, Aiken, SC (US)

(73) Assignee: Canopex, Aiken, SC (US)

(*) Notice: Subject to any disclaimer, the term of this patent is extended or adjusted under 35 U.S.C. 154(b) by 364 days.

(21) Appl. No.: 11/736,841

(22) Filed: Apr. 18, 2007

Related U.S. Application Data

(60) Provisional application No. 60/832,794, filed on Jul. 24, 2006.

(51) Int. Cl.
*G01B 3/00* (2006.01)
*G01B 5/00* (2006.01)
*G01B 21/00* (2006.01)

(52) U.S. Cl. .......................................... 702/33

(58) Field of Classification Search .............. 702/33, 702/34–35, 39, 40, 155, 158, 159, 166, 170, 702/171; 356/3, 3.02, 3.03
See application file for complete search history.

(56) References Cited

U.S. PATENT DOCUMENTS 4,532,710 A * 8/1985 Kinney et al. ............... 33/772
5,331,992 A * 7/1994 Gremont ..................... 135/124
5,537,201 A * 7/1996 Kumagai et al. ............ 356/4.08
2008/0006087 A1* 1/2008 Winter et al. ................ 73/584

FOREIGN PATENT DOCUMENTS

JP   2001-343234   * 12/2001
JP   2004-226162   *  8/2004
RU      1816966    *  5/1993

* cited by examiner

*Primary Examiner*—Michael P. Nghiem
*Assistant Examiner*—Cindy H Khuu
(74) *Attorney, Agent, or Firm*—Michael A. Mann; Nexsen Pruet, LLC

(57) ABSTRACT

A set of tools is provided for inspecting and obtaining critical data concerning the support structure of a canopy on support columns. The data obtained is entered into a computer programmed to generate a structure integrity report based on the data. The tools include a measurement wheel, an electronic level, a digital camera, a laser distance meter, an ultrasonic thickness gauge and optionally, a ladder and a drill. The computer can be local to the inspection or remote, and, if the latter, in communication with a personal digital assistant with wireless telephone capability into which the user can enter data.

5 Claims, 7 Drawing Sheets

TOOLS FOR EVALUATING AND REPORTING CANOPY INTEGRITY

CROSS REFERENCE TO RELATED PATENTS

The priority benefit of US provisional patent application Ser. No. 60/832,794, filed Jul. 24, 2006, is claimed.

BACKGROUND OF THE INVENTION

Canopy structures such as those installed at vehicle fuel dispensing service stations typically have flat roofs supported by hollow vertical columns made of corrodible material such as steel. The typical canopy has a fascia around its roof which creates a wind load that is taken into account in the design of the support system. The support columns are often used as conduits for draining water from the flat roof, thus exposing the interior of the columns to corrosive deterioration, which may be entirely internal. Eventually, the canopy support columns may weaken to a dangerous condition resulting in a collapse of the canopy without the owner or operating personnel being aware of their dangerously weakened condition. Such a collapse may occur during a high wind condition with or without rainfall.

It is important to note that there are a very large number of canopies in use today. The task of inspecting all of them on some sort of reasonable schedule is daunting.

Accordingly, there is a need for a way to effectively inspect canopies so that their condition can be properly assessed and repairs timely made.

SUMMARY OF THE INVENTION

This invention provides a unique set of tools particularly suited to obtain the critical data for evaluating the strength of canopy support structures. This tool set, is combined with a programmed computer with wireless telephone capabilities, or, alternatively, with a personal digital assistant that can transmit the data to a remote computer. Data are collected by use of the tools, and fed into the computer for analysis and generation of a report detailing the condition of the canopy support structure. The computer-generated report details the nature, location and magnitude of deficiencies uncovered through use of the tools.

A feature of the present invention is that it addresses the present daunting problem of inspecting a large number of canopies by separating the data gathering task from the data analysis task, providing to those who gather the data the right tools to rapidly combine the critical data needed into a common report format for those who are trained to analyze that data.

Other features and their advantages will be apparent to those skilled in the art of building inspection from a careful reading of the detailed description accompanied by the following drawings.

BRIEF DESCRIPTION OF THE DRAWINGS

The attached drawings show tools used in obtaining data, processing data and generating a report of the condition of the structural support of a canopy, in which.

DETAILED DESCRIPTION OF THE INVENTION

Figure 1:
FIG. 1 shows a digital distance measuring wheel used to collect canopy and site dimensions.

Canopy structures such as those used at vehicle fuel service stations are typically supported by two or more vertical hollow steel columns and in most instances the canopy roof is drained through the hollow support columns. The interior of the support columns may corrode or rust to such an extent that there is danger of collapse of the canopy. Such danger can be detected by timely inspection of the canopy. This invention provides a set of tools for efficiently inspecting a canopy structure and, in combination with a programmed computer, generating a written report concerning the integrity of the canopy support structure.

In order to adequately evaluate the structural integrity of a canopy support structure it is necessary to gather and evaluate critical data. The collecting of data can be done by those who are not structural engineers but who are trained and have the present tool set. Structural engineers can thus devote all their time to analyzing the reports and none to collecting the data. Trained data collectors can use the present tool kit to collect the right data and present them in report form with appropriate illustrations showing location and the condition of areas of deterioration in the canopy support structure. The report would be analyzed by structural experts to determine whether corrective action or replacement was warranted.

In addition to vertically supporting the roof of the canopy, the support columns must be strong enough to resist the bending force imposed by action of the wind against the fascia of the canopy. Standard formulas are used to evaluate the structure, based on engineering design techniques that comply with the International Building Code. The so-called flag pole formula is used to calculate the potential for overturning based on the overall canopy dimensions including the height and width of the fascia and the clearance height between the ground and the fascia. The bending moment is calculated based on the fascia area, its height above the ground and the International Building Code Wind Zone requirements for the geographical area of the canopy. The column dimensions, their number and spacing are used to determine the stress to which they are subjected.

The tools presented herein are used in combination to obtain a complete set of critical data for analysis. As such, they comprise a kit that a trained technician would use when inspecting a canopy. The tools not only obtain the critical data but facilitate its input into a report-generating programmed computer that is either a local computer capable of transmitting the report, or, alternatively, the data can be transmitted to a remote computer capable of generating the report, or a combination of a local computer that can access a remote computer. In this last instance, the local computer provides the user interface to facilitate input of data and images and provides access to the internet (or other network) so that the user can connect to the remote computer. The remote computer is programmed with an application that allows the user to forward data entered into the local computer, either via a keyboard or USB port or firewire, to the remote computer where it is processed by the software application into a suitable, standardized report.

The digital distance measuring wheel 21 shown in FIG. 1 is an ideal tool to measuring the width and length of the canopy quickly and accurately, while minimally interfering with the on-going conduct of business at the associated service station. The inspector records the dimensions on an initially prepared overall sketch of the inspection site. The horizontal location of the support columns 22 relative to the roof and to each other is determined using the digital distance measuring wheel by measuring the length and width of the canopy and the distances between it and support columns 22. This spatial data is recorded on a sketch or drawing of a plan view of the canopy. The data may be transmitted electronically to a remote computer, preferably by use of a personal digital assistant with wireless telephone capability, such as a BLACKBERRY by Research In Motion, Inc., or the data can be entered directly into a computer capable of transmitting the report.

Herein, the term computer refers to one or more devices that are in communication with each other, that receive digital information for producing an electronic report. The electronic report can be printed out or retransmitted, for example, as an attachment to email. The computer can be a personal digital assistant (PDA) in communication with a suitably programmed personal computer so that the PDA can receive the digital data and forward it to the personal computer. The computer, not shown in FIGS. 1-7 but is shown in FIG. 8, is preferably equipped with the capability to upload digital images and is programmed with spreadsheet software such as MICROSOFT EXCEL and with drawing software such as AUTOCAD LITE to produce an engineering drawing of the canopy and support column structure from the entered data that is suitable for use in the report.

Figure 2:
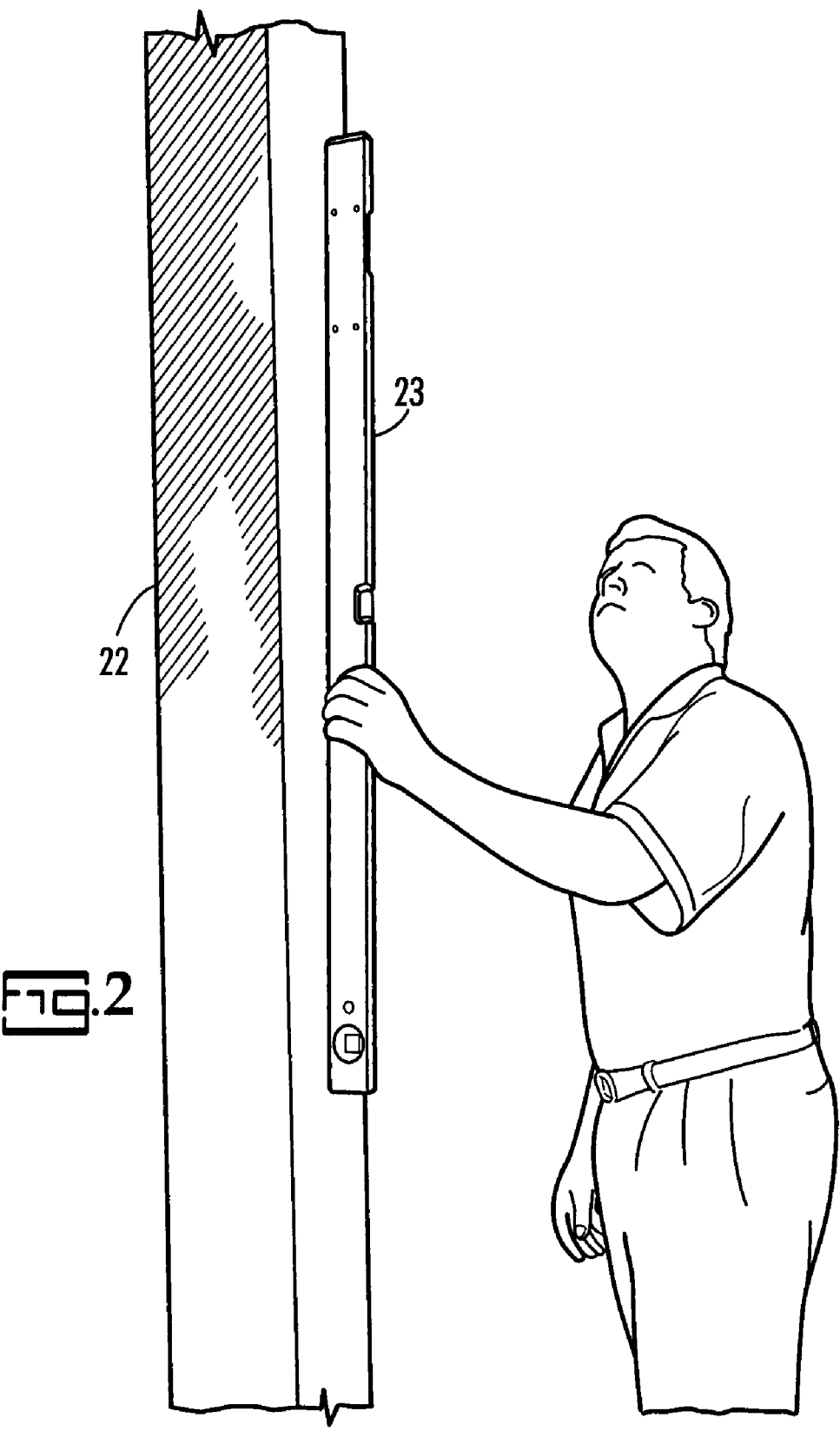
FIG. 2 shows an electronic level being used to determine the plumb condition of a canopy support column.

FIG. 2 shows an electronic level 23 being used to measure the verticality of the support column 22. The degree to which it is out of plumb is recorded for future reference and calculations concerning the integrity of the canopy support structure. This data is also incorporated into the report and transmitted via computer. The verticality in degrees is inserted into the programmed computer.

Figure 3:
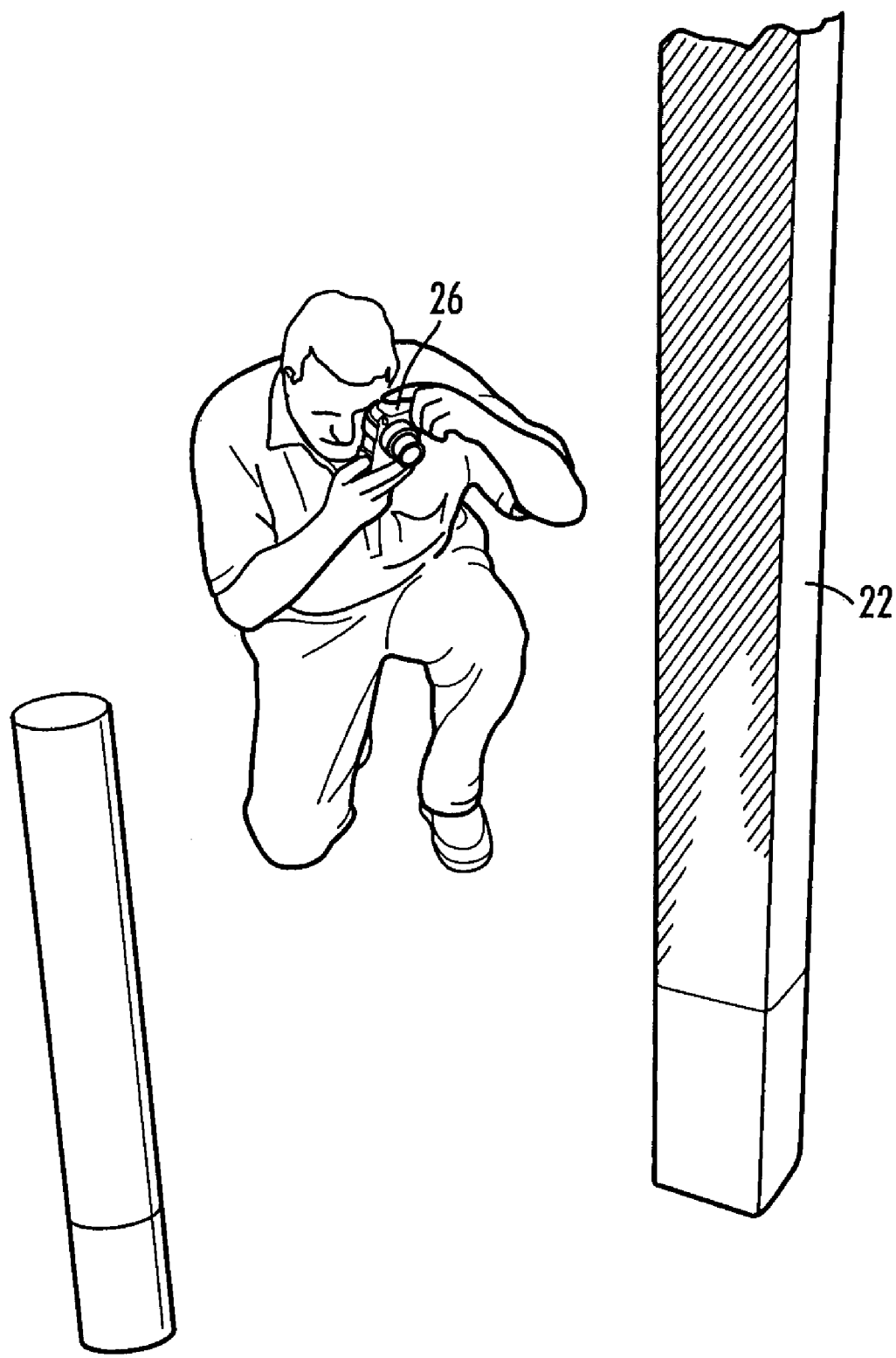
FIG. 3 shows a digital camera being used to record the condition of the bottom of a canopy support column.

As shown in FIG. 3, a digital camera 26 is being used to produce a photographic record in the form of digital images of the condition of the canopy support structure. The inspector is shown taking a picture of the lower end of the column and the concrete support floor. A drain opening is in the bottom of the column side facing the inspector. Rust stains on the floor indicate interior rusting and deterioration of the support column 22. It is the image of the rust stains on the floor and rust on the column itself that is digitally recorded, uploaded to the computer and transmitted as part of the report. Digital images are either uploaded into the computer directly or transmitted to the remote computer for uploading and eventual inclusion into the report.

Figure 4:
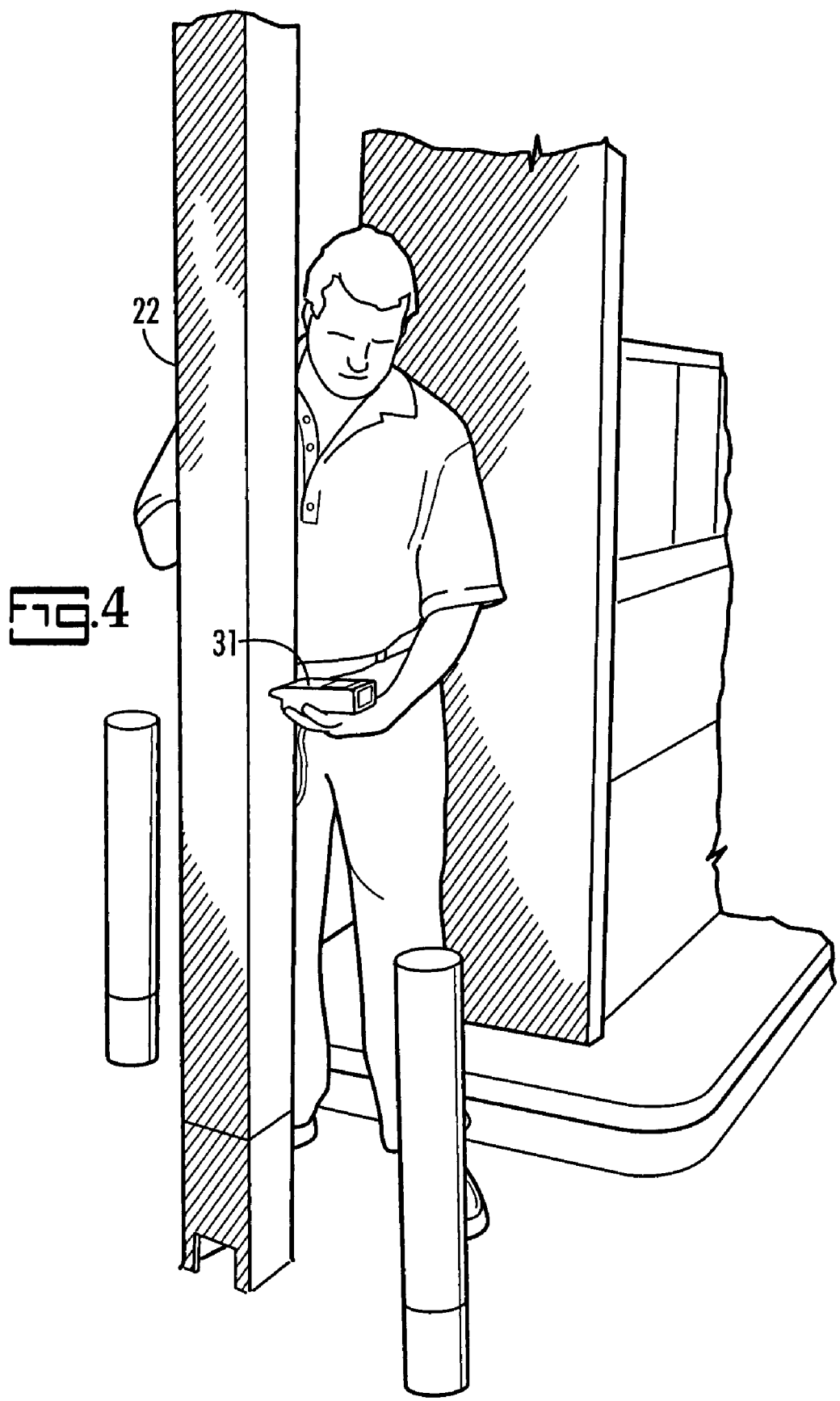
FIG. 4 shows a laser distance meter being used to measure distances between support columns.

The laser distance meter 31 used by the inspector in FIG. 4, is a convenient tool for measuring accurately the distances between support columns. This instrument is also used to measure the height of the canopy and can be used to triangulate distances, thus avoiding the need to use a ladder and tape measure to obtain needed canopy dimensions. These dimensions are entered into the computer and incorporated into a report.

Figure 5:
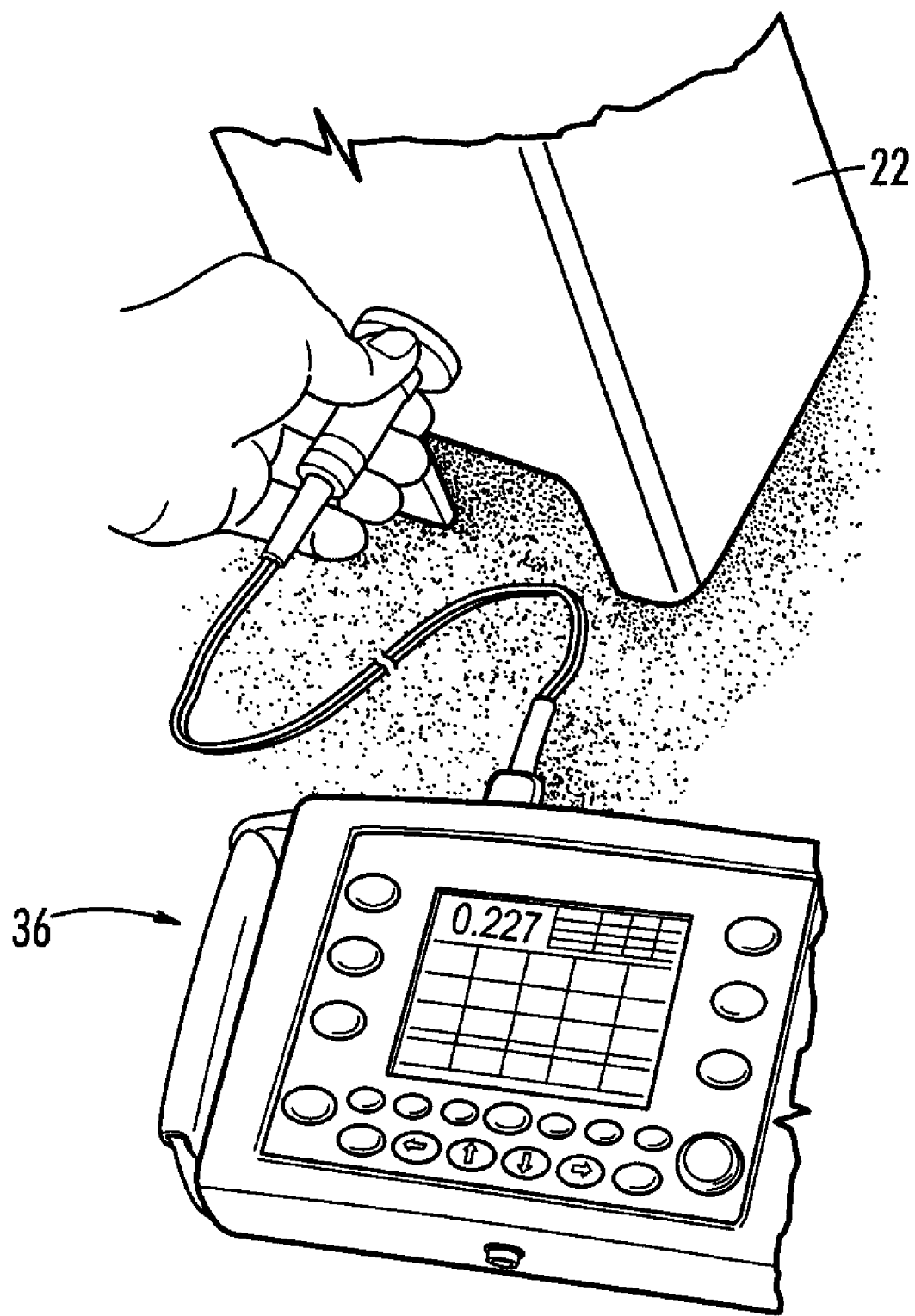
FIG. 5 shows an ultrasonic thickness gauge being used to measure the wall thickness of a canopy support column near its lower end.

FIG. 5 shows an ultrasonic scan record thickness gauge 36 being used to determine the thickness of a wall of the support column 22. The gauge includes software that allows the inspector to upload the data saved on gauge 36 to a computer (not shown in FIG. 5). This data is also entered for incorporation into the report being generated by the computer, and can then be transmitted.

Figure 6:
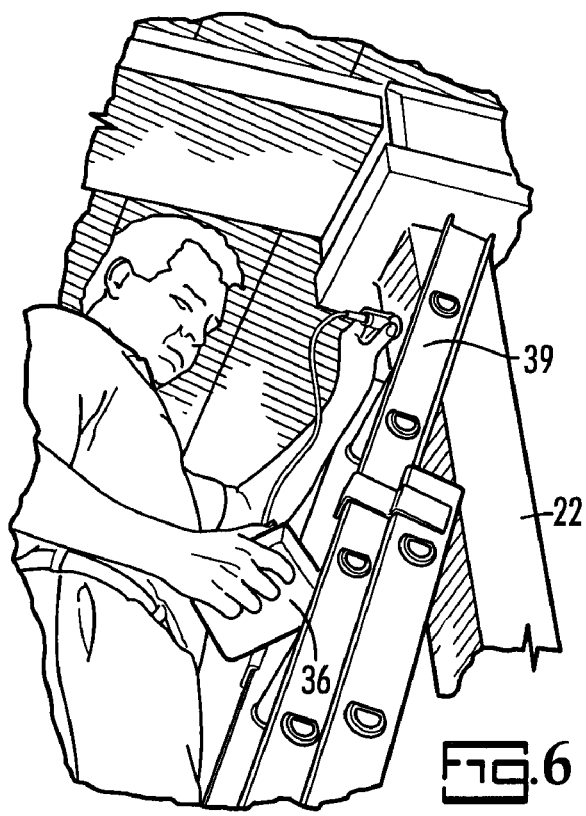
FIG. 6 shows the ultrasonic thickness gauge being used to measure the wall thicknesses of canopy support columns near its upper end.

The thickness data is also compared to the thickness of the originally installed column to evaluate the condition of the inspected column, particularly relative to current code standards. FIG. 6 shows the inspector on an extension ladder 39 measuring and recording the wall thickness of the column 22 near its top using the ultrasonic thickness gauge 36. A spreadsheet application, such as Microsoft Excel software or similar software, used to program the computer is used to perform calculations necessary from thickness data to determine column strength.

Figure 7:
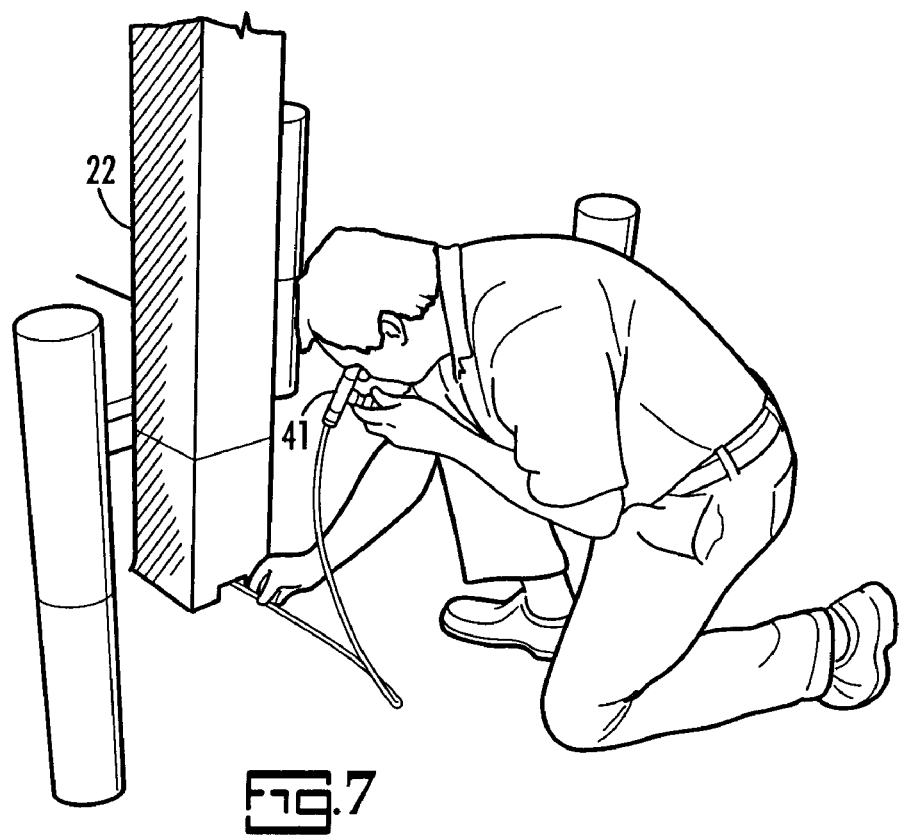
FIG. 7 shows a lighted fiberscope being used to observe the interior of the lower end of a canopy support column.
Figure 8:
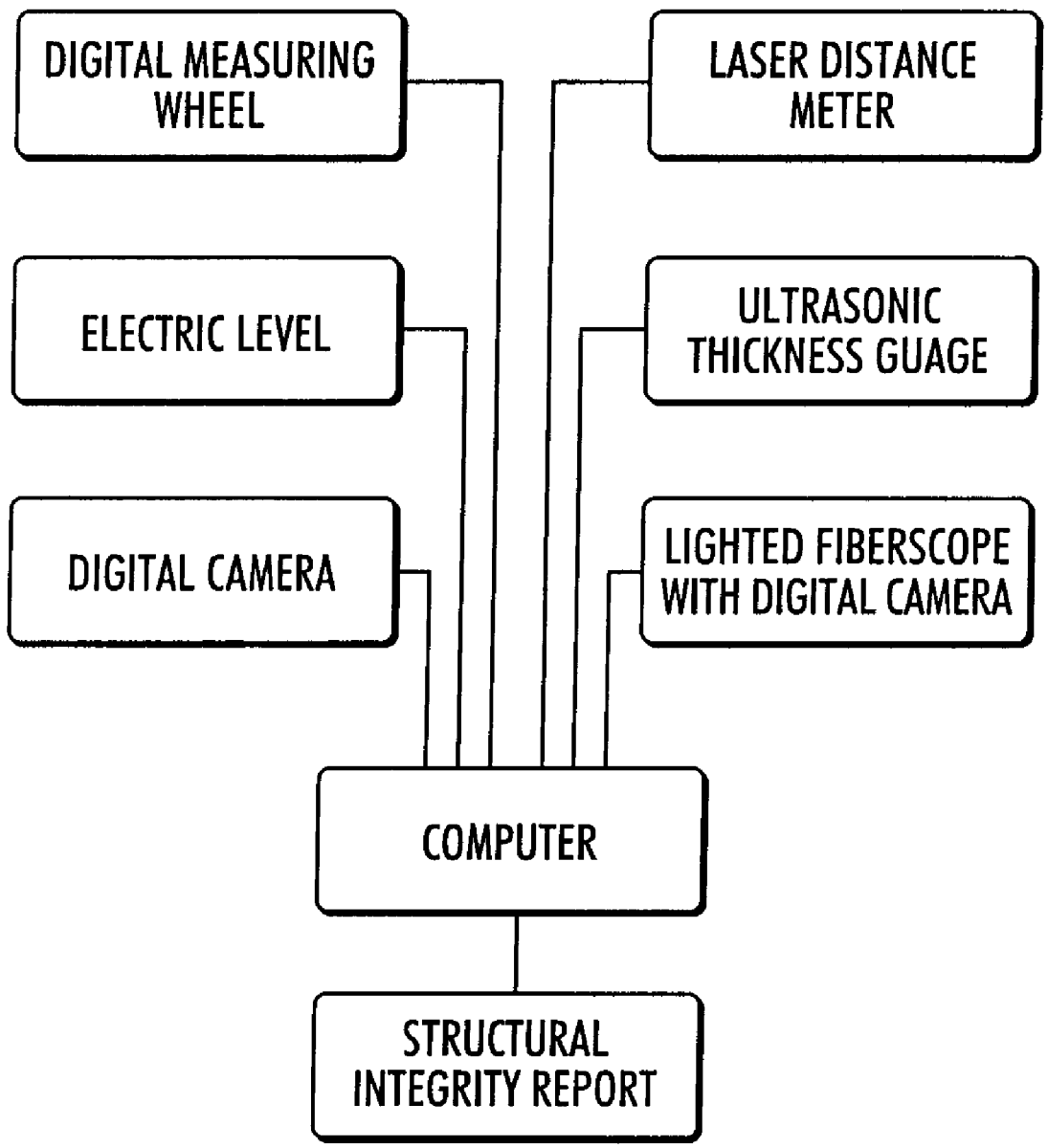
FIG. 8 shows data gathered by test equipment fed to a computer used in generating a structural integrity report.

FIG. 7 shows the inspector using a lighted fiberscope 41 to observe the interior of the lower end of a support column 22 having an opening at its lower end. The inspector observes not only rust conditions inside column 22 but can also observe obstructions to drainage via the opening through which the probe is extended. Other areas of the support column 22 can be inspected by drilling relatively small holes in the support columns 22 with a portable electric drill, not shown and which is an optional component of the present kit, and inserting the probe of the fiberscope 41 through the drilled hole. The digital camera 26, shown in FIG. 3, may be used to record the observed conditions, and the pictures can be uploaded into the computer and included in the inspection report.

FIG. 8 is a flow chart showing various instruments delivering data to a computer for recording and processing purposes. It shows how the various tools of this canopy inspection toolset cooperate to provide all the critical data needed to evaluate the condition of a canopy. The computer is used to assemble the data into a usable form, namely, a report, preferably having a standard format. The computer is programmed with a software application to facilitate creation of the report so that the canopy inspector need only follow a sequence of prompts, enter the requested data and digital images, and the report will be automatically generated. The computer may be in reality a local computer, a remote computer, or a combination of the two, with the local computer being used for data-entry interface from the user and from the tools that have digital output (such as the digital camera, for example). Once the data is entered, it may be transmitted to a remote computer for creation of the report later or the local computer can be used to access the remote computer via the internet, LAN line, or other network connection. The remote computer generates the report in this instance as the user enters data using the local computer. The local computer can alternatively receive the input and either generate a report locally or save the data for later uploading to the remote computer. A personal digital assistant device with wireless telephone capability, preferably a BLACKBERRY or equivalent, for example, may be used to receive digital data from the user and transmit the collected data to a remote personal computer; however, all information gathered using the tools is entered into a the computer via one or more familiar user interfaces.

The application that generates the report uses template technology to format and present the data and images so that the report preferably has a standardized appearance and is therefore easily for structural engineers to navigate and find the information they are looking for. The computer delivers the report via a printer, not shown, together with photographic images for structural integrity analysis. The report thus provides the canopy owner the information needed to decide if remedial action is necessary. The report may include recommendations as to the nature and extent of repairs that should be made to prevent failure of the canopy.

Those skilled in the art of canopy inspection will recognize that many substitutions and modifications can be made to the foregoing preferred embodiment without departing from the spirit and scope of the present invention, defined by the appended claims.

What is claimed is:

1. A set of tools for evaluating and reporting the structural integrity of a canopy on hollow support columns, comprising:
   a digital distance measurement wheel operable to obtain canopy dimensions;
   an electronic level for determining verticality measurements of said support columns;
   a digital camera operable to record images of said support columns;
   a fiberscope for use with said digital camera to record images of the interior of said support column;
   a laser distance meter operable to measure canopy height, distances between support columns and canopy fascia height permitting calculation of loading on the canopy support frame; and
   an ultrasonic thickness gauge operable to scan and record the thickness of the walls of said support columns,
   said canopy dimensions, verticality measurements, images, canopy height, distances and fascia height and thickness comprising data being collected for analysis of structural integrity of said canopy on said support columns.

2. The set of tools of claim 1 including a computer adapted to receive data obtained by use of said measurement wheel, said electronic level, said digital camera, said laser distance meter and said ultrasonic thickness gauge and programmed to cause an associated printer to print at least segments of a report concerning the structural integrity of said canopy support columns.

3. The set of tools of claim 2, wherein said computer includes a personal digital assistant.

4. The set of tools of claim 1 including a step ladder.

5. The set of tools of claim 1 including an electric drill.

\* \* \* \* \*